United States Patent Office 3,056,953
Patented Oct. 2, 1962

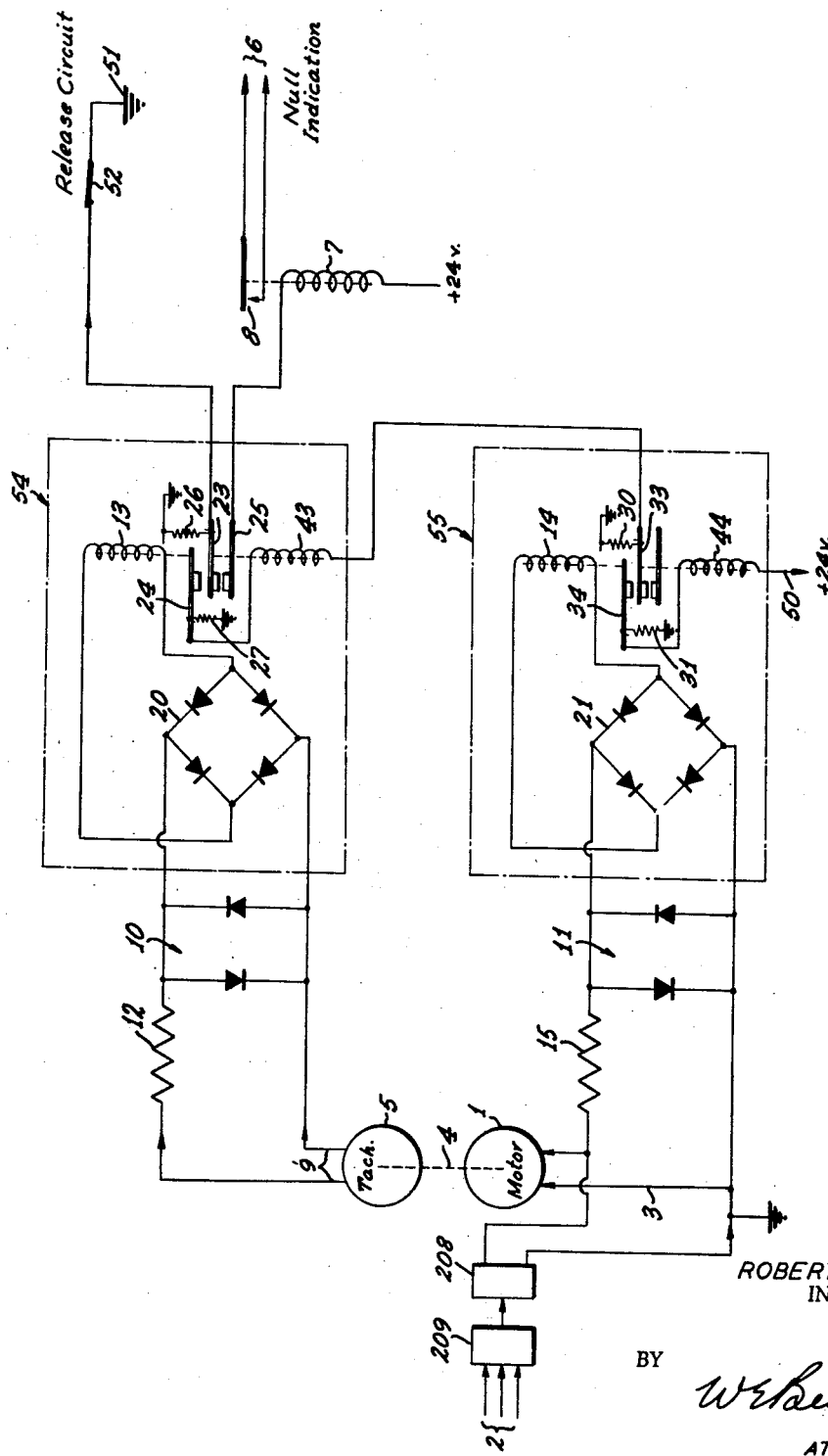

3,056,953
POSITIONAL AND VELOCITY NULL INDICATOR FOR MACHINE CONTROL SYSTEMS
Robert W. Tripp, Bronxville, N.Y., assignor to Inductosyn Corporation, Carson City, Nev., a corporation of Nevada
Filed July 16, 1959, Ser. No. 827,518
5 Claims. (Cl. 340—282)

In the use of servo controlled machine tool systems it is frequently desirable to know when the system has reached the correct position. For example, in a drilling machine or jig borer which is servo controlled, a signal is desired which will advise that the programmed position has been reached and that the drilling or boring operation can proceed. In previous equipments, use has been made of a circuit which would close a pair of contacts when the position error voltage fell below a predetermined small magnitude and remained below this value for some predetermined length of time. The time delay is necessary in this form of circuit since normally, the system will pass through null several times before it stops, for example as described in Patent 2,561,346 to De Vlieg et al., and it is necessary to prevent a false null signal at a transitory null.

An object of the invention is to provide a signal which will indicate not only that the servoed system has reached the correct position, but also that it has stopped moving.

The advantage of such a signal or information is that it may be communicated to automatic controls so that the next operation can proceed. Such automatic controls, for example, might initiate a clamping mode to hold the machine table in place while a boring operation proceeds, or the contacts of a relay receiving such information might turn on a light to indicate "position reached."

The invention takes advantage of the fact that there are two electrical phenomena that occur at the correct position. One is that the positional error signal to the servo motor is reduced to its lowest voltage level, i.e., null. The other is that the motion of the table has ceased so that a voltage proportional to velocity would also be reduced to its lowest level. This velocity voltage may be derived from a tachometer, or from a derivative circuit.

Both phenomena must exist to give a correct signal. The reason for this is that if only positional nulls were used, then the circuit would operate even if the machine passed the correct position, and every time it passed. This happens consistently with servoed systems which must overshoot the position two or three times before stopping. The speed and inertia of the table, for instance, are so high that the motor cannot stop the first time it reaches the correct position, but coasts past so that it receives a reverse command to return. Each time this happens, the positional null occurs and could give a false signal of correct position if it was the only control for the null circuit.

If, on the other hand, only velocity nulls were used, then a false signal of "correct position" would be given if the table were jammed so that it could not move. Correct position would also be indicated each time the direction of travel reverses, since velocity passes through zero at this time such as commonly occurs during servo positioning.

The objects of the present invention are accomplished by providing a null circuit which uses coincidence of position and velocity nulls, therefore, insuring that the null position signal of the present invention indicates that the machine is both at position and stopped.

For further details of the invention reference may be made to the drawings wherein the FIGURE illustrates a null circuit according to the present invention.

Referring in detail to the drawings, a typical servo controlled system is described and claimed in Patent 2,849,668, issued August 26, 1958 to applicant for Automatic Machine Control. The motor 1 in the present drawings corresponds to motor 207 FIG. 10 of the patent, 208 in the present drawings corresponds to the servo amp. identified by the same number in FIG. 10 of the patent and the switch 209 of the present drawings corresponds to the switch by the same number in FIG. 10 of the patent, the three inputs of the coarse, medium and fine increments of the error signal being shown in the patent and having their counterparts in the three lines indicated by the reference number 2 in the present drawings.

In the present drawings, the A.C. input to the motor 1 is indicated at 3.

Motor 1 has a shaft 4 which drives a tachometer 5, to thereby produce a voltage proportional to velocity of the motor 1 and the machine element driven thereby. The voltage at input 3 is proportional to the position of the machine element such as the machine slide 204 in FIG. 10 of the patent, this voltage being the final error signal which causes the motor 1 to turn. It is the result of the combined computing and measuring circuits of the system. For simplicity this voltage which is proportional to position is taken from the input 3 to motor, although it may be derived from any other suitable point in the error signal channel.

A null indication is given on line 6 by relay 7 closing its contacts 8, on the coincidence of a substantially zero position representative voltage at input 3 and a substantially zero velocity position representative voltage in the output 9 of tachometer 5. Since either of the voltages in input 3 and line 9 can be of either polarity, an A.C. rectifier type of meter is employed so that the operation is independent of polarity.

The drawing shows the contacts 24, 23 and 25 (and 34, 33) in the position they would assume when the sensitive coil 13 (and 14) was *energized*, and when the booster coil 43 (and 44) was *de-energized*.

The sensitive coil and the booster coil actually oppose each other when energized, as shown—the sensitive coil pulling contact 24 up, and the booster coil pulling it down (similarly for relay 55).

Back-to-back rectifiers indicated at 10 and 11 and a series resistance indicated at 12 and 15 are employed in both the circuits 3 and 9 to prevent burn-out of the sensitive coils 13 and 14 respectively of the relays 54 and 55. The output of circuit 9 is thus limited by the elements 10 and 12, rectified by rectifier 20 and supplied to coil 13. Similarly the input 3 is limited by the elements 15 and 11, rectified by rectifier 21 and supplied to coil 14. Sensitive coil 13 operates swinger 24. Similarly sensitive coil 14 operates swinger 34. When coils 13 and 14 are de-energized, due to the fact that their input voltages are substantially zero, this allows swinger 24 to contact flexible contact 23, under action of their respective springs 27 and 26, similarly 34 contacting 33, under action of their similar respective springs 31 and 30. Due to the sensitivity of swingers 24 and 34 the contact pressure between 23 and 24, also between 33 and 34 is slight. However, the booster coils 43 and 44 are now energized through the contacts 23, 24, also 33 and 34, battery indicated at 50 and ground 51, switch 52 being closed. This provides a comparatively strong magnetic field to increase the contact pressure so that flexible contact 23 is pushed by swinger 24 against fixed contact 25 of relay 54 with sufficient force to make a good electrical connection, whereby the coil of relay 7 is energized, contact 8 is closed, and a signal given on line 6 indicating that the inputs in both circuits 3 and 9 are substantially zero.

The release circuit switch 52 automatically opens the ground return from 51 whenever new positional information is read in to the various inputs indicated at block 4 in the patent. The switch contact of switch 52 herein may be located on a stepping switch which cycles each time new information is inserted. In the present case, it is shown as a simple single throw switch. The switch 52 serves to de-energize the booster coils 43 and 44 so that thereafter, an input voltage on the sensitive coils 13 and 14 will be operative to open the contacts 23, 24 and 33, 34, until such time as the coincidence of substantially zero voltage input at 3 and 9, as described above. The switch 52 therefore overcomes the difficulty that if the sensitive coils 13 and 14 were energized after their respective booster coils 43 and 44 had operated, the former could not provide sufficient force to overcome their booster coils, and therefore could not open their respective contacts 23, 24 and 33, 34, whereas after de-energizing the booster coils 43, 44 by operating switch 52, then energizing the sensitive coils 13 and 14 will cause their respective swingers 24 and 34 to break contact with their respective flexible contacts 23 and 33.

I claim:

1. A null circuit comprising an error signal input, a motor controlled by said input, a tachometer driven by said motor, a relay having a sensitive coil in circuit with said tachometer, another relay having a sensitive coil in circuit with said error signal input, said sensitive coils each havng in circuit therewith a rectifier and a power limiter, each of said relays having a booster coil, each of said relays having first and second contacts held open when said sensitive coils are energized, said first and second contacts being in series with their respective booster coils, said first and second contacts closing when the inputs to their respective sensitive coils are substantially zero, such closing of said first and second contacts acting to energize said booster coils, an additional contact closed when one of said booster coils is energized and a null relay having a coil in circuit with said additional contact, and a release circuit switch for de-energizing said booster coils to thereafter render said sensitive coils operative, when energized, to open said first and second contacts.

2. A positional and velocity null indicator for machine control systems, having a servo controlled motor, said indicator comprising an input circuit providing an alternating current input proportional to the position of a machine element driven by said motor, said input circuit having two branches, each having a rectifier, one of said rectifiers supplying a D.C. signal proportional to the position of said machine element, said other rectifier having a tachometer input and supplying a signal proportional to the velocity of said machine element, and means having an input of both of said signals for providing another signal when both of said first-mentioned signals are substantially zero.

3. A null circuit for a servo controlled motor, said circuit comprising means providing an electrical input proportional to position of a machine element driven by said motor, means providing an electrical input proportional to velocity of said machine element and separate means each having an input of one of said first mentioned means for providing a null signal when its respective input is null, and a signal device having inputs from both of said separate means for providing a signal when both of said position and velocity inputs are simultaneously substantially zero.

4. A null circuit comprising a motor having an error signal input depending upon the position of an element driven by said motor, a tachometer driven by said motor, means responsive to said error signal and other means responsive to said tachometer for providing null signals when said error signal and the output of said tachometer respectively are substantially zero, and a signal device having inputs from both of said means and providing a null signal only when said error signal and the output of said tachometer are simultaneously substantially zero.

5. A null circuit having an error signal input depending upon the position of a driven element, means responsive to the absolute value of the error and other means responsive to the absolute value of the rate of change of error represented by said signal to provide null signals when said absolute values respectively are substantially zero, and a signaling device having an input from both of said means for providing a signal when said error and said rate of change of error are simultaneously substantially zero and not when either thereof has a finite value other than zero.

References Cited in the file of this patent

UNITED STATES PATENTS 2,008,912 Hudd _____ July 23, 1935
2,832,020 Towner _____ Apr. 22, 1958